United States Patent
Yang (10) Patent No.: US 9,462,104 B2
(45) Date of Patent: Oct. 4, 2016

(54) METHOD OF USING LIGHT SENSOR EARPHONE TO CONTROL ELECTRONIC DEVICE AND LIGHT SENSOR EARPHONE

(71) Applicant: ZTE Corporation, Shenzhen (CN)

(72) Inventor: Yunzhi Yang, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 0 days.

(21) Appl. No.: 14/443,452

(22) PCT Filed: Jul. 23, 2013

(86) PCT No.: PCT/CN2013/079897
§ 371 (c)(1),
(2) Date: May 18, 2015

(87) PCT Pub. No.: WO2013/174324
PCT Pub. Date: Nov. 28, 2013

(65) Prior Publication Data
US 2015/0281421 A1    Oct. 1, 2015

(30) Foreign Application Priority Data
Nov. 19, 2012 (CN) .......................... 2012 1 0468178

(51) Int. Cl.
| | |
|---|---|
| H04M 1/00 | (2006.01) |
| H04B 1/38 | (2015.01) |
| H04M 1/60 | (2006.01) |
| G01J 1/00 | (2006.01) |
| H04R 1/10 | (2006.01) |
| H04W 8/22 | (2009.01) |

(52) U.S. Cl.
CPC .............. *H04M 1/6058* (2013.01); *G01J 1/00* (2013.01); *H04R 1/1041* (2013.01); *H04W 8/22* (2013.01)

(58) Field of Classification Search
CPC .......... A61B 5/6815; H04M 2250/12; H04M 1/6058; H04W 8/22
USPC ........................................................ 455/557
See application file for complete search history.

(56) References Cited

U.S. PATENT DOCUMENTS

| | | | |
|---|---|---|---|
| 2010/0197360 A1 | 8/2010 | Namgoong | |
| 2012/0022382 A1* | 1/2012 | Daisuke ................. | A61B 5/002 600/481 |

FOREIGN PATENT DOCUMENTS

| | | |
|---|---|---|
| CN | 2901444 Y | 5/2007 |
| CN | 101951534 A | 1/2011 |

(Continued)

OTHER PUBLICATIONS

International Search Report for corresponding application PCT/CN2013/079897 filed Jul. 23, 2013; Mail date Oct. 24, 2013.

(Continued)

*Primary Examiner* — Eugene Yun
(74) *Attorney, Agent, or Firm* — Cantor Colburn LLP (57) ABSTRACT

Provided is a method of using a light sensor earphone to control an electronic device. The method includes: a light sensor earphone detecting light intensity of an ear close side and light intensity of an ear outer side according to a received light signal; comparing the light intensity of the close ear side with the light intensity of the ear outer side, and generating an electric signal corresponding to a current mode of an electronic device according to a comparison result; and sending the electric signal to the electronic device, for the electronic device to control a corresponding function in the current mode according to the electric signal. A light sensor earphone is also provided. By means of the technical solutions, the light sensor earphone is utilized to intelligently control corresponding functions of the electronic device so as to simplify operation.

10 Claims, 5 Drawing Sheets

(56) References Cited

FOREIGN PATENT DOCUMENTS

| CN | 102984615 A | 3/2013 |
|---|---|---|
| EP | 2077091 A2 | 7/2009 |
| WO | 2011127063 A1 | 10/2011 |
| WO | 2013158996 A1 | 10/2013 |

OTHER PUBLICATIONS

European Search Report for corresponding application EP 13 79 3246; Report dated Nov. 3, 2015.

* cited by examiner

METHOD OF USING LIGHT SENSOR EARPHONE TO CONTROL ELECTRONIC DEVICE AND LIGHT SENSOR EARPHONE

TECHNICAL FIELD

The present disclosure relates to the technical field of semiconductors, and in particular to a method of using a light sensor earphone to control an electronic device, and a light sensor earphone.

BACKGROUND

Currently, all multimedia electronic devices basically support a function of playing via an earphone, and many multimedia electronic devices are also equipped with matched wire control earphones. Via the wire control earphone, the turn-on/off of the multimedia electronic device and other corresponding functions may be controlled. For example, via a wire control switch of the wire control earphone, answering/calling or playing music may be controlled. However, whether the wire control earphone or non-wire control earphone, earphone playing may only be achieved by controlling on the screen or controlling on the wire control switch. For the currently used earphone, when having an incoming call, a user needs to wear the earphone and operates on the screen or via the wire control, at this moment, the user is in a rush and a muddle. While the multi-function wire control switch buttons of the wire control earphone are relatively complicated which is easy to result in error operation, and furthermore, the wire control switch is implemented by hardware, and use for multiple times is easy to lead loss.

SUMMARY

The embodiments of the present disclosure provide a method of using a light sensor earphone to control an electronic device, and a light sensor earphone, intended to intelligently control corresponding functions of the electronic device via the light sensor earphone so as to simplify operation, and error operation does not happen easily.

An embodiment of the present disclosure provides a method of using a light sensor earphone to control an electronic device, including:

the light sensor earphone detecting light intensity of an ear close side and light intensity of an ear outer side according to a received light signal;

comparing the light intensity of the ear close side with the light intensity of the ear outer side, and generating an electric signal corresponding to a current mode of the electronic device according to a comparison result; and sending the electric signal to the electronic device, for the electronic device to control a corresponding function in the current mode according to the electric signal.

In an example embodiment, the current mode of the electronic device at least includes an answering/calling mode and a multimedia file playing mode.

In an example embodiment, generating the electric signal corresponding to the current mode of the electronic device according to the comparison result includes:

when the light intensity of the ear close side is weaker than the light intensity of the ear outer side, generating an electric signal used for controlling the electronic device to answer/call or play a multimedia file; and when the light intensity of the ear close side is close to the light intensity of the ear outer side, generating an electric signal used for controlling the electronic device to turn off an earphone function.

In an example embodiment, after generating an electric signal used for controlling the electronic device to answer/call or play the multimedia file, the method further includes:

when the current mode of the electronic device is a multimedia file playing mode, if repeated light changes generated by user operation gestures are detected, generating an electric signal for switching a multimedia file.

Another embodiment of the present disclosure provides a light sensor earphone, including:

an ear close side light sensor component, configured to detect light intensity of an ear close side according to a received light signal;

an ear outer side light sensor component, configured to detect light intensity of an ear outer side according to a received light signal;

a comparison component, configured to compare the light intensity of the ear close side with the light intensity of the ear outer side;

an electric signal generation component, configured to generate an electric signal corresponding to a current mode of the electronic device according to a comparison result of comparing the light intensity of the ear close side and the light intensity of the ear outer side; and a sending component, configured to send the electric signal to the electronic device, for the electronic device to control a corresponding function in the current mode according to the electric signal.

In an example embodiment, the electric signal generation component includes:

a first electric signal generation element, configured to, when the light intensity of the ear close side is weaker than the light intensity of the ear outer side, generate an electric signal used for controlling the electronic device to answer/call or play a multimedia file; and a second electric signal generation element, configured to, when the light intensity of the ear close side is close to the light intensity of the ear outer side, generate an electric signal used for controlling the electronic device to turn off an earphone function.

In an example embodiment, the electric signal generation component further includes:

a third electric signal generation element, configured to, when the current mode of the electronic device is a multimedia file playing mode, if repeated light changes generated by user operation gestures are detected, generate an electric signal for switching a multimedia file.

In the embodiments of the present disclosure, the light sensor earphone detects light intensity of an ear close side and light intensity of an ear outer side according to a received light signal; then, the light intensity of the close ear side is compared with the light intensity of the ear outer side, and an electric signal corresponding to a current mode of the electronic device is generated according to a comparison result; and the electric signal is sent to the electronic device, for the electronic device to control a corresponding function in the current mode according to the electric signal. The light sensor earphone is utilized to intelligently control corresponding functions of the electronic device so as to simplify operation. Because corresponding judgment is carried out according to the light intensity, error operation does not happen easily. Furthermore, a wire control switch does not need to be used so that loss of the earphone is reduced.

DESCRIPTION OF EMBODIMENTS

Objectives and advantages related to the present disclosure will be illustrated in the subsequent descriptions and appended drawings.

It should be understood that specific embodiments described here are only used for illustrating the present disclosure and not intended to limit the present disclosure.

An embodiment of the present disclosure provides a method of using a light sensor earphone to control an electronic device. The light sensor earphone detects light intensity of an ear close side and light intensity of an ear outer side and generates a corresponding electric signal for controlling the electronic device, for the electronic device to control corresponding functions.

Figure 1:
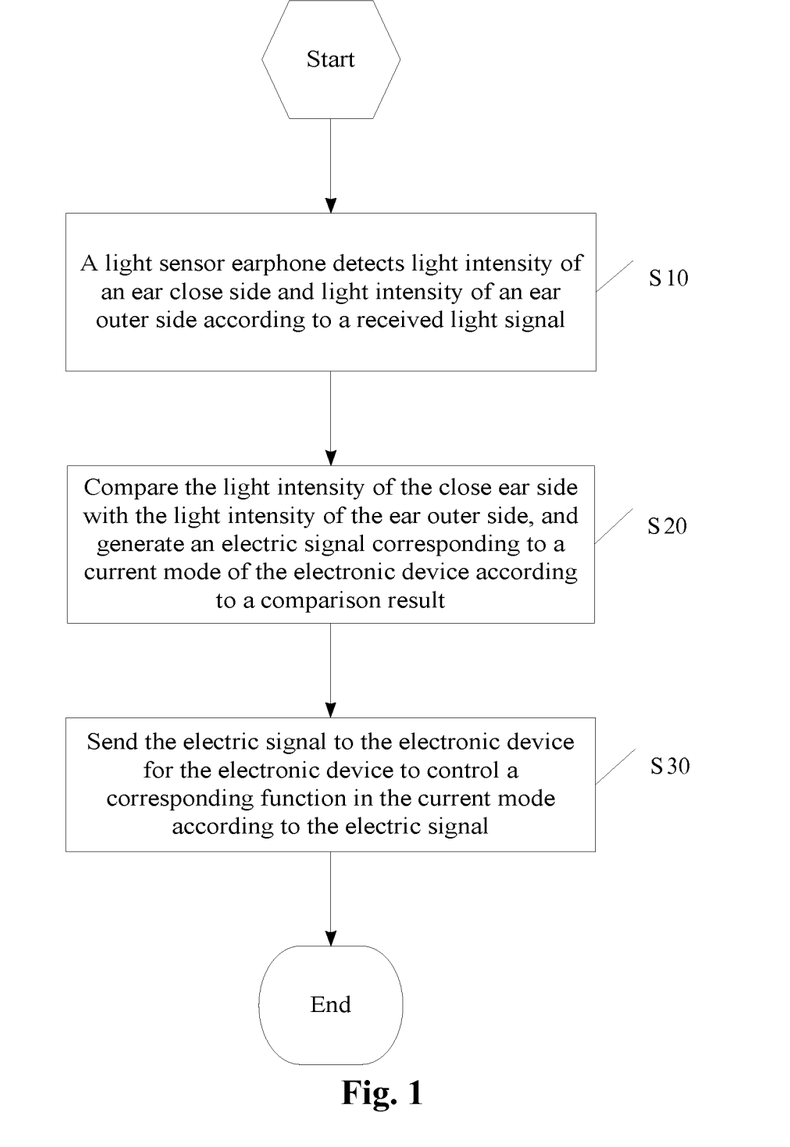
FIG. 1 is a schematic diagram showing the flow of a method of using a light sensor earphone to control an electronic device according to an embodiment of the present disclosure.

Referring to FIG. 1, FIG. 1 is a schematic diagram showing the flow of a method of using a light sensor earphone to control an electronic device according to an embodiment of the present disclosure.

The method of using a light sensor earphone to control an electronic device provided by this embodiment includes the following steps S10 to S30.

Step S10, the light sensor earphone detects light intensity of an ear close side and light intensity of an ear outer side according to a received light signal.

In this embodiment, light sensor components for receiving a light signal are respectively provided at the ear close side and the ear outer side of the light sensor earphone. After the light signal is received, the corresponding light sensor components respectively detect light intensity of an ear close side and light intensity of an ear outer side. When the light sensor earphone is used to achieve corresponding functions of the electronic device, firstly the light sensor earphone is connected to the electronic device, i.e. the light sensor earphone is started, and is then inserted into ear(s); and when a user does not need to use the earphone, the light sensor earphone will be taken out from the ear(s). When the light sensor earphone is in the ear(s) and after the light sensor earphone is taken out from the ear(s), the light sensor component provided at the ear close side senses the light at the inner side of the ear, and detects the light intensity of the ear close side, and meanwhile, the light sensor component provided at the ear outer side senses the light at the outer side of the ear, and detects the light intensity of the ear outer side.

Step S20, the light intensity of the ear close side is compared with the light intensity of the ear outer side, and an electric signal corresponding to a current mode of the electronic device is generated according to a comparison result.

The light of the ear close side and of the ear outer side is sensed. After the light intensity of the ear close side and the light intensity of the ear outer side are respectively detected, the light intensity of the ear close side is compared with the light intensity of the ear outer side, and an electric signal corresponding to a current mode of the electronic device is generated according to a comparison result. In this embodiment, the current mode of the electronic device may at least include an answering/calling mode and a multimedia file playing mode, etc.

Since when the light sensor earphone is in the ear(s), the light sensor component located at the inner side of the ear cannot receive a light signal, while the light sensor component located at the outer side of the ear can receive a light signal, at this moment, by comparing the light intensity of the ear close side with the light intensity of the ear outer side, it can be obtained that there is a relatively large difference between the light intensity of the ear close side and the light intensity of the ear outer side, and thus it can be determined that a user inserts the light sensor earphone into the ear(s) at this moment. If the user takes out the light sensor earphone from the ear(s), since the environment where the ear close side is the same as the light intensity of the ear outer side, the light signals received thereby are the same, and the light intensity of the ear close side is close to the light intensity of the ear outer side by comparison at this moment.

Step S30, the electric signal is sent to the electronic device, for the electronic device to control a corresponding function in the current mode according to the electric signal.

After the corresponding electric signal is generated according to the current mode of the electronic device, the electric signal is sent to the electronic device, for the electronic device to control, according to corresponding electric signal, an answering/calling function in the answering/calling mode and multimedia file playing mode, etc. and a function of switching to the multimedia file playing mode. In addition, the functions of the light sensor earphone may also be controlled to be turned off according to the electric signal sent by the light sensor earphone, and various functions in the corresponding mode are turned off at the same time.

In this embodiment of the present disclosure, the light sensor earphone detects light intensity of an ear close side and light intensity of an ear outer side according to a received light signal; then, the light intensity of the close ear side is compared with the light intensity of the ear outer side, and an electric signal corresponding to a current mode of the electronic device is generated according to a comparison result; and the electric signal is sent to the electronic device, for the electronic device to control a corresponding function in the current mode according to the electric signal. The light sensor earphone is utilized to intelligently control corresponding functions of the electronic device so as to simplify operation. Because corresponding judgment is carried out according to the light intensity, error operation does not happen easily. Furthermore, a wire control switch does not need to be used so that loss of the earphone is reduced.

Figure 2:
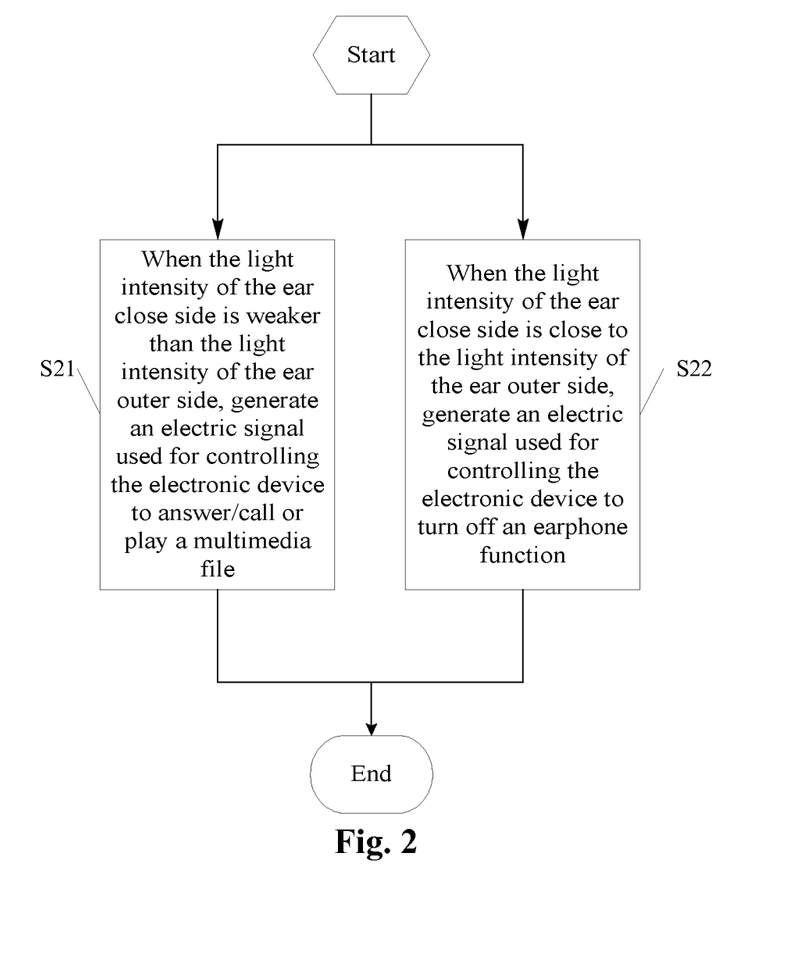
FIG. 2 is a schematic diagram showing the flow of generating an electric signal corresponding to a current mode of the electronic device in the method of using the light sensor earphone to control the electronic device according to an embodiment of the present disclosure.

Referring to FIG. 2, FIG. 2 is a schematic diagram showing the flow of generating an electric signal corresponding to a current mode of the electronic device in the method of using the light sensor earphone to control the electronic device according to an embodiment of the present disclosure.

In the embodiment above, step S20 may include the following steps S21 to S22.

Step S21, when the light intensity of the ear close side is weaker than the light intensity of the ear outer side, an electric signal used for controlling the electronic device to answer/call or play a multimedia file is generated.

Step S22, when the light intensity of the ear close side is close to the light intensity of the ear outer side, an electric signal used for controlling the electronic device to turn off an earphone function is generated.

In this embodiment, when it is obtained via comparison that the light intensity of the ear close side is weaker than the light intensity of the ear outer side, it represents that a user inserts the light sensor earphone into ear(s). If the electronic device is in a scenario of answering a call currently, and the user inserts the light sensor earphone, then it represents that the user needs to answer a call, and at this moment, an electric signal for controlling the electronic device to answer the call is generated. After having received the signal, the electronic device controls to answer the call. If the user inputs a number or opens an entry of a contacts record, a call record, etc., i.e. the electronic device is in a scenario of initiating a call currently, and the user inserts the light sensor earphone, then it represents that the user needs to initiating a call, and at this moment, an electric signal for controlling the electronic device to initiating the call is generated. After having received the signal, the electronic device controls to initiating the call. If the electronic device is in a scenario other than answering/calling currently, and the user inserts the light sensor earphone, then it represents that the user needs to enter the multimedia file playing mode, and at this moment, an electric signal for controlling the electronic device to play a multimedia file is generated. After having received the signal, the electronic device controls to play a multimedia file.

When the light intensity of the ear close side and the light intensity of the ear outer side are compared to obtain that the light intensity of the ear close side is close to the light intensity of the ear outer side, i.e. the user has taken out the light sensor earphone from the ear(s), at this moment, whether the electronic device is in an answering/calling mode or playing a multimedia file currently, it represents that the user wants to exit the current mode, and an electric signal for controlling the electronic device to turn off the earphone function is generated. In this embodiment, in order to prevent error operation due to accidentally falling off of a single side earphone, the electric signal for controlling the electronic device to turn off the earphone function can only be generated when it is determined that the light intensity of the ear close side of both the left and right earphones is close to the light intensity of the ear outer side. After the electronic device turns off the light sensor earphone according to the electric signal, operations of hanging up or suspending playing a multimedia file, etc. are completed at the same time according to the scenario of the current mode.

The light intensity of the ear close side is compared with the light intensity of the ear outer side, when the light intensity of the ear close side is weaker than the light intensity of the ear outer side, an electric signal for controlling the electronic device to answer/call or play a multimedia file is generated; and when the light intensity of the ear close side is close to the light intensity of the ear outer side, an electric signal of controlling the electronic device to turn off the earphone function is generated. According to different comparison results of the light intensity of the ear close side and the light intensity of the ear outer side, different corresponding electric signals for controlling the electronic device are generated, thereby further ensuring that error operation does not happen easily.

Figure 3:
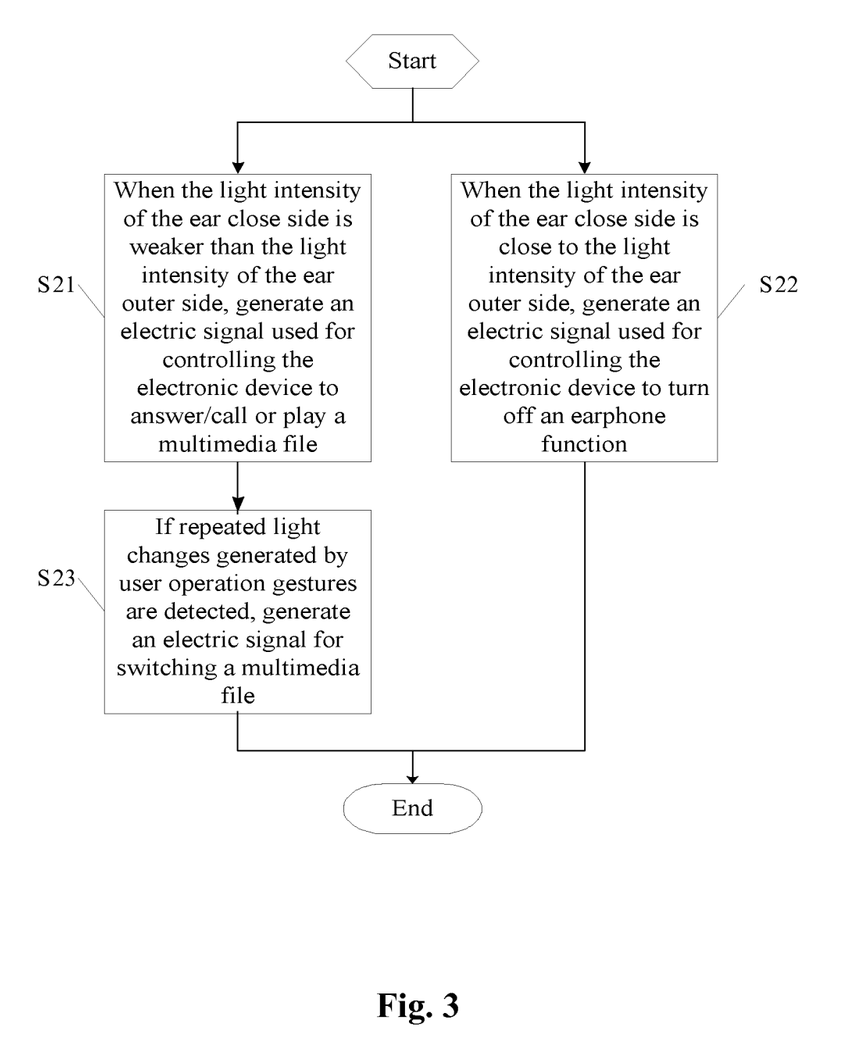
FIG. 3 is a schematic diagram showing the flow of a method of using a light sensor earphone to control an electronic device according to another embodiment of the present disclosure.

Referring to FIG. 3, FIG. 3 is a schematic diagram showing the flow of a method of using a light sensor earphone to control an electronic device according to another embodiment of the present disclosure.

On the basis of the embodiment above, after step S21, the method may further include the following step S23.

Step S23, when the current mode of the electronic device is a multimedia file playing mode, if repeated light changes generated by user operation gestures are detected, generating an electric signal for switching a multimedia file.

When the electronic device is in other modes except for the answering/calling mode currently, and it is determined that the light intensity of the ear close side of the light sensor earphone is weaker than the light intensity of the ear outer side, i.e. when a multimedia file playing mode is entered according to user requirements, if the user wants to switch to the previous or next multimedia file, operation may be performed by means of gestures. In this embodiment, it may be configured that a gesture of rapidly shaking back and forth more than twice at the outer side of the light sensor earphone by the user is a switching instruction to the previous or next multimedia file, and configured that the user shaking at the outer side of the left side earphone is a switching instruction of switching to the previous multimedia file, while the user shaking at the outer side of the right side earphone is a switching instruction of switching to the next multimedia file.

When the light sensor earphone detects repeated light changes generated by user operation gestures, then it represents that the user needs to switch a multimedia file at this moment. Depending on whether the switching instruction of switching a multimedia files is from the left side earphone or the right side earphone, a corresponding electric signal of switching to the previous or next multimedia file is generated.

When the current mode of the electronic device is a multimedia file playing mode, if repeated light changes generated by user operation gestures are detected, an electric signal for switching a multimedia file is generated. The operation of controlling corresponding functions of the electronic device via the light sensor earphone is enabled to be more simplified and more intelligent.

An embodiment of the present disclosure provides a light sensor earphone.

Figure 4:
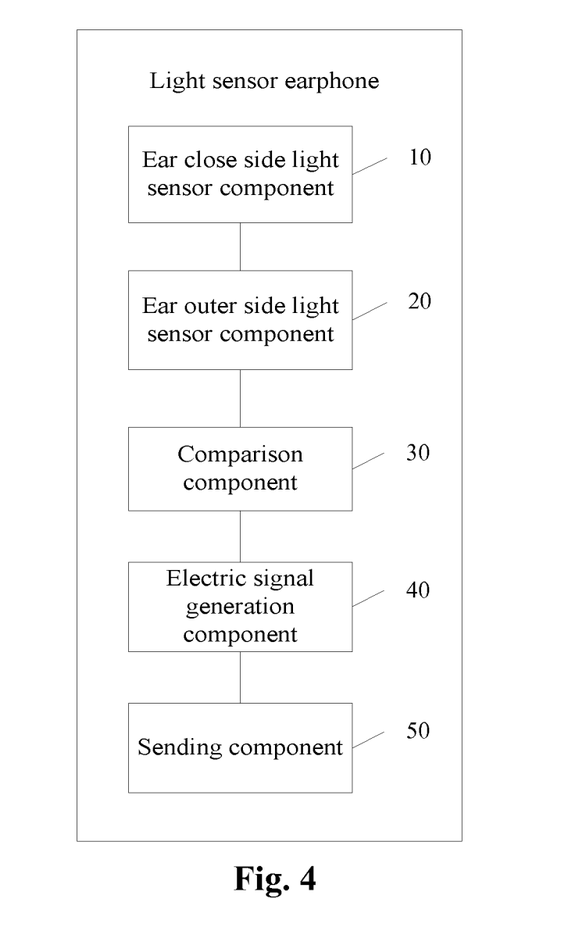
FIG. 4 is a schematic diagram showing the structural of a light sensor earphone according to an embodiment of the present disclosure.

Referring to FIG. 4, FIG. 4 is a schematic diagram showing the structural of a light sensor earphone according to an embodiment of the present disclosure.

The light sensor earphone provided by this embodiment includes:

an ear close side light sensor component 10, configured to detect light intensity of an ear close side according to a received light signal;

an ear outer side light sensor component 20, configured to detect light intensity of an ear outer side according to a received light signal;

a comparison component 30, configured to compare the light intensity of the ear close side with the light intensity of the ear outer side;

an electric signal generation component 40, configured to generate an electric signal corresponding to a current mode of the electronic device according to a comparison result of comparing the light intensity of the ear close side and the light intensity of the ear outer side; and a sending component 50, configured to send the electric signal to the electronic device, for the electronic device to control a corresponding function in the current mode according to the electric signal.

In this embodiment, light sensor components 10 for receiving a light signal is respectively provided at the ear close side and the ear outer side of the light sensor earphone, and after the light signal is received, the ear close side light sensor component 10 and the ear outer side light sensor component 20 respectively detect light intensity of an ear close side and light intensity of an ear outer side. When the light sensor earphone is used to achieve corresponding functions of the electronic device, firstly the light sensor earphone is connected to the electronic device, i.e. the light sensor earphone is started, and is then inserted into ear(s). When a user does not need to use the earphone, the light sensor earphone will be taken out from the ear(s). When the light sensor earphone is in the ear(s) and after the light sensor earphone is taken out from the ear(s), the light sensor component provided at the ear close side senses the light at the inner side of the ear, and detects the light intensity of the ear close side, and meanwhile, the light sensor component provided at the ear outer side senses the light at the outer side of the ear, and detects the light intensity of the ear outer side.

The light of the ear close side and of the ear outer side is sensed. After light intensity of an ear close side and light intensity of an ear outer side is respectively detected, the light intensity of the ear close side is compared with the light intensity of the ear outer side via the comparison component 30, and an electric signal corresponding to a current mode of the electronic device is generated according to a comparison result via the electric signal generation component 40. In this embodiment, the current mode of the electronic device may at least include an answering/calling mode and a multimedia file playing mode, etc.

Since when the light sensor earphone is in the ear(s), the light sensor component located at the inner side of the ear cannot receive light signals, while the light sensor component located at the outer side of the ear receives light signals, at this moment, by comparing the light intensity of the ear close side with the light intensity of the ear outer side, it can be obtained that there is a relatively large difference between the light intensity of the ear close side and the light intensity of the ear outer side, and thus it can be determined that a user inserts the light sensor earphone into the ear(s) at this moment. If the user takes out the light sensor earphone from the ear(s), since the environment where the ear close side is the same as the light intensity of the ear outer side, the light signals received thereby are the same, and the light intensity of the ear close side is close to the light intensity of the ear outer side by comparison at this moment.

After the corresponding electric signal is generated according to the current mode of the electronic device, the sending component 50 sends the electric signal to the electronic device, for the electronic device to control, according to corresponding electric signals, an answering/calling function in the answering/calling mode and multi-media file playing mode, etc. and a function of switching to the multimedia file playing mode. In addition, the functions of the light sensor earphone may also be controlled to be turned off according to the electric signals sent by the light sensor earphone, and various functions in the corresponding mode are turned off at the same time.

In this embodiment of the present disclosure, the light sensor earphone detects light intensity of an ear close side and light intensity of an ear outer side according to a received light signal; then, the light intensity of the close ear side is compared with the light intensity of the ear outer side, and an electric signal corresponding to a current mode of the electronic device is generated according to a comparison result; and the electric signal is sent to the electronic device, for the electronic device to control a corresponding function in the current mode according to the electric signal. The light sensor earphone is utilized to intelligently control corresponding functions of the electronic device so as to simplify operation. Because corresponding judgment is carried out according to the light intensity, error operation does not happen easily. Furthermore, a wire control switch does not need to be used so that loss of the earphone is reduced.

Figure 5:
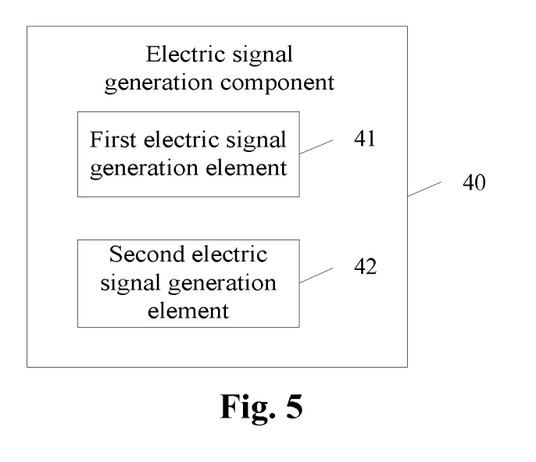
FIG. 5 is a schematic diagram showing the structure of an electric signal generation component of a light sensor earphone according to an embodiment of the present disclosure.

Referring to FIG. 5, FIG. 5 is a schematic diagram showing the structure of an electric signal generation component of a light sensor earphone according to an embodiment of the present disclosure.

In the embodiment above, the electric signal generation component 40 includes:

a first electric signal generation element 41, configured to, when the light intensity of the ear close side is weaker than the light intensity of the ear outer side, generate an electric signal used for controlling the electronic device to answer/call or play a multimedia file; and a second electric signal generation element 42, configured to, when the light intensity of the ear close side is close to the light intensity of the ear outer side, generate an electric signal used for controlling the electronic device to turn off an earphone function.

In this embodiment, when it is obtained via comparison that the light intensity of the ear close side is weaker than the light intensity of the ear outer side, it represents that a user inserts the light sensor earphone into ear(s). If the electronic device is in a scenario of answering a call currently, and the user inserts the light sensor earphone, then it represents that the user needs to answer a call, and at this moment, the first electric signal generation element 41 generates an electric signal used for controlling the electronic device to answer the call. After having received the signal, the electronic device controls to answer the call. If the user inputs a number or opens an entry of a contacts record, a call record, etc., i.e. the electronic device is in a scenario of initiating a call currently, and the user inserts the light sensor earphone, then it represents that the user needs to initiating a call, and at this moment, the first electric signal generation element 41 generates an electric signal used for controlling the electronic device to initiating the call. After having received the signal, the electronic device controls to initiating the call. If the electronic device is in a scenario other than answering/calling currently, and the user inserts the light sensor earphone, then it represents that the user needs to enter the multimedia file playing mode, and at this moment, the first electric signal generation element 41 generates an electric signal used for controlling the electronic device to play a multimedia file. After having received the signal, the electronic device controls to play a multimedia file.

When the light intensity of the ear close side and the light intensity of the ear outer side are compared to obtain that the light intensity of the ear close side is close to the light intensity of the ear outer side, i.e. the user has taken out the light sensor earphone from the ear(s), at this moment, whether the electronic device is in an answering/calling mode or playing a multimedia file currently, it represents that the user wants to exit the current mode, and the second electric signal generation element 42 generates an electric signal for controlling the electronic device to turn off the earphone function. In this embodiment, in order to prevent error operation due to accidentally falling off of a single side earphone, the an electric signal for controlling the electronic device to turn off the earphone function can only be generated when it is determined that the light intensity of the ear close side of both the left and right earphones is close to the light intensity of the ear outer side. After the electronic device turns off the light sensor earphone according to the electric signal, operations of hanging up or suspending playing a multimedia file, etc. are completed at the same time according to the scenario of the current mode.

The light intensity of the ear close side is compared with the light intensity of the ear outer side, when the light intensity of the ear close side is weaker than the light intensity of the ear outer side, an electric signal for controlling the electronic device to answer/call or play a multimedia file are generated; and when the light intensity of the ear close side is close to the light intensity of the ear outer side, electric signals of controlling the electronic device to turn off the earphone function are generated. According to different comparison results of the light intensity of the ear close side and the light intensity of the ear outer side, different corresponding electric signals for controlling the electronic device are generated, thereby further ensuring that error operation does not happen easily.

Figure 6:
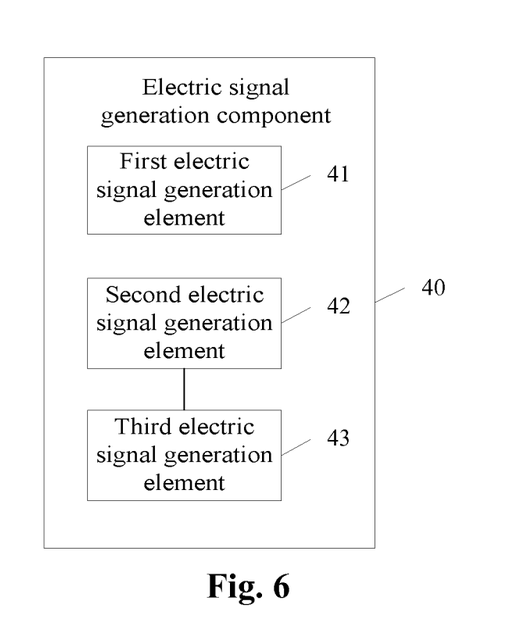
FIG. 6 is a schematic diagram showing the structure of a light sensor earphone according to another embodiment of the present disclosure.

Referring to FIG. 6, FIG. 6 is a schematic diagram showing the structure of a light sensor earphone according to another embodiment of the present disclosure.

On the basis of the embodiment above, the electric signal generation component 40 may further includes:

a third electric signal generation element 43, configured to, when the current mode of the electronic device is a multimedia file playing mode, if repeated light changes generated by user operation gestures are detected, generate an electric signal for switching a multimedia file.

When the electronic device is in other modes except for the answering/calling mode currently, and it is determined that the light intensity of the ear close side of the light sensor earphone is weaker than the light intensity of the ear outer side, i.e. when a multimedia file playing mode is entered according to user requirements, if the user wants to switch to the previous or next multimedia file, operation may be performed by means of gestures. In this embodiment, it may be configured that a gesture of rapidly shaking back and forth more than twice at the outer side of the light sensor earphone by the user is a switching instruction to the previous or next multimedia file, and configured that the user shaking at the outer side of the left side earphone is a switching instruction of switching to the previous multimedia file, while the user shaking at the outer side of the right side earphone is a switching instruction of switching to the next multimedia file.

When the light sensor earphone detects repeated light changes generated by user operation gestures, then it represents that the user needs to switch a multimedia file at this moment. Depending on whether the switching instruction of switching a multimedia files is from the left side earphone or the right side earphone, the third electric signal generation element 43 generates a corresponding electric signal of switching to the previous or next multimedia file.

When the current mode of the electronic device is a multimedia file playing mode, if repeated light changes generated by user operation gestures are detected, an electric signal for switching a multimedia file is generated. The operation of controlling corresponding functions of the electronic device via the light sensor earphone is enabled to be more simplified and more intelligent.

The above is only the example embodiments of the present disclosure and is not intended to limit the present disclosure. Any replacements of the equivalent structure or the equivalent flow based on the contents of the specification and drawings of the present disclosure, or direct or indirect application of the equivalent replacements in other related technical fields shall fall within the scope defined by the claims of protection of the present disclosure.

What is claimed is:

1. A method of using a light sensor earphone to control an electronic device, comprising:
    the light sensor earphone detecting light intensity of an ear close side and light intensity of an ear outer side according to a received light signal;
    comparing the light intensity of the ear close side with the light intensity of the ear outer side, and generating an electric signal corresponding to a current mode of the electronic device according to a comparison result; and
    sending the electric signal to the electronic device, for the electronic device to control a corresponding function in the current mode according to the electric signal.

2. The method according to claim 1, wherein the current mode of the electronic device at least comprises an answering/calling mode and a multimedia file playing mode.

3. The method according to claim 2, wherein after generating the electric signal used for controlling the electronic device to answer/call or play the multimedia file, the method further comprises:
    when the current mode of the electronic device is a multimedia file playing mode, if repeated light changes generated by user operation gestures are detected, generating an electric signal for switching a multimedia file.

4. The method according to claim 2, wherein generating the electric signal corresponding to the current mode of the electronic device according to the comparison result comprises:
    when the light intensity of the ear close side is weaker than the light intensity of the ear outer side, generating an electric signal used for controlling the electronic device to answer/call or play a multimedia file; and
    when the light intensity of the ear close side is close to the light intensity of the ear outer side, generating an electric signal used for controlling the electronic device to turn off an earphone function.

5. The method according to claim 4, wherein after generating the electric signal used for controlling the electronic device to answer/call or play the multimedia file, the method further comprises:
    when the current mode of the electronic device is a multimedia file playing mode, if repeated light changes generated by user operation gestures are detected, generating an electric signal for switching a multimedia file.

6. The method according to claim 1, wherein after generating the electric signal used for controlling the electronic device to answer/call or play the multimedia file, the method further comprises:
    when the current mode of the electronic device is a multimedia file playing mode, if repeated light changes generated by user operation gestures are detected, generating an electric signal for switching a multimedia file.

7. A light sensor earphone, comprising
an ear close side light sensor component, configured to detect light intensity of an ear close side according to a received light signal;
an ear outer side light sensor component, configured to detect light intensity of an ear outer side according to a received light signal;
a comparison component, configured to compare the light intensity of the ear close side with the light intensity of the ear outer side;
an electric signal generation component, configured to generate an electric signal corresponding to a current mode of an electronic device according to a comparison result of comparing the light intensity of the ear close side and the light intensity of the ear outer side; and
a sending component, configured to send the electric signal to the electronic device, for the electronic device to control a corresponding function in the current mode according to the electric signal.

8. The light sensor earphone according to claim 7, wherein the electric signal generation component comprises:
a first electric signal generation element, configured to, when the light intensity of the ear close side is weaker than the light intensity of the ear outer side, generate an electric signal used for controlling the electronic device to answer/call or play a multimedia file; and
a second electric signal generation element, configured to, when the light intensity of the ear close side is close to the light intensity of the ear outer side, generate an electric signal used for controlling the electronic device to turn off an earphone function.

9. The light sensor earphone according to claim 8, wherein the electric signal generation component further comprises:
a third electric signal generation element, configured to, when the current mode of the electronic device is a multimedia file playing mode, if repeated light changes generated by user operation gestures are detected, generate an electric signal for switching a multimedia file.

10. The light sensor earphone according to claim 7, wherein the current mode of the electronic device at least comprises an answering/calling mode and a multimedia file playing mode.

* * * * *